US006185677B1

United States Patent
Nijhawan (10) Patent No.: US 6,185,677 B1
(45) Date of Patent: Feb. 6, 2001

(54) AUTOMATIC GENERATION OF ACPI SOURCE LANGUAGE FOR PERIPHERAL RESOURCE CONFIGURATION

(75) Inventor: Vijay Bharat Nijhawan, Fremont, CA (US)

(73) Assignee: Phoenix Technologies Ltd.

(*) Notice: Under 35 U.S.C. 154(b), the term of this patent shall be extended for 0 days.

(21) Appl. No.: 09/163,358

(22) Filed: Sep. 30, 1998

(51) Int. Cl.[7] .................................................. G06F 15/177
(52) U.S. Cl. ............................... 713/2; 713/100; 713/320
(58) Field of Search ............................. 713/2, 1, 100, 713/320, 323, 324, 330; 717/1, 2, 3, 7, 11

(56) References Cited

U.S. PATENT DOCUMENTS

| | | | | |
|---|---|---|---|---|
| 5,727,217 | * | 3/1998 | Young | 710/260 |
| 5,938,765 | * | 8/1999 | Dove et al. | 713/1 |
| 5,999,730 | * | 12/1999 | Lewis | 395/702 |
| 6,105,142 | * | 8/2000 | Goff et al. | 713/324 |
| 6,112,164 | * | 8/2000 | Hobson et al. | 702/132 |
| 6,115,813 | * | 9/2000 | Hobson et al. | 713/1 |

OTHER PUBLICATIONS

*Advanced Configuration and Power Interface Specification*, published by Intel Microsoft Toshiba, (revision 1.0a), Jul. 1, 1998, pp. i–xvii and 6–111–6–145.

* cited by examiner

Primary Examiner—Thomas G. Black
Assistant Examiner—Mary Wang
(74) Attorney, Agent, or Firm—Foley & Lardner (57) ABSTRACT

A method and article of manufacture for the automatic generation of Advanced Configuration and Power Management Interface ("ACPI") Source Language ("ASL") code in a Basic Input-Output System ("BIOS") of a computer system having an ACPI compliant BIOS. The method scans all device node structures in the BIOS to find the device node structures corresponding to static and MCD devices. ASL code is generated corresponding to the device node structure by extracting the PnP Id of the devices and generating the required control methods.

20 Claims, 4 Drawing Sheets

AUTOMATIC GENERATION OF ACPI SOURCE LANGUAGE FOR PERIPHERAL RESOURCE CONFIGURATION

BACKGROUND OF THE INVENTION

1. Field of the Invention

This invention relates generally to the field of configuration of computer systems, and specifically to the automatic generation of Advanced Configuration and Power Management Interface ("ACPI") Source Language ("ASL") code for the peripheral resource configuration of a computer having an ACPI enabled operating system("OS").

2. Description of the Related Art

ACPI is a specification jointly developed and released to the public by Microsoft, Intel, and Toshiba. It defines an extensible means by which an OS can be given greater control over the power management and resource management in computer systems, such as PCs. ACPI defines a hardware and software interface by which an OS can manipulate the characteristics of motherboard devices. This technology differs from existing Basic Input/Output System ("BIOS") technologies in at least two regards: (i) the BIOS support code is written in a p-code called ACPI Machine Language ("AML"), discussed further herein, rather than in the native assembly language of a platform; and (ii) the BIOS support code does not determine the policies or time-outs for power or resource management. Rather, these policies are determined by the operating system.

The ACPI hardware interface provides functionality to the OS in two categories (i) control/detection of system control events using a normal interrupt called System Control Interrupt ("SCI"), rather than a System Management Interrupt ("SMI"), and (ii) control of the system power state. The details of a platform's support for the hardware interface are provided in a set of well-defined tables within the system BIOS.

The ACPI software interface provides the means for the OS to find the different ACPI related tables in the system BIOS and means for the OS to understand and control the characteristics of the motherboard devices using AML. The AML resides in the tables within the system BIOS.

ACPI Source Language ("ASL") provides the mechanism by which the OS controls power management, Plug-n-Play and docking support under the latest releases of, for example, the Windows and Windows NT operating systems that are required to be ACPI compliant. The ASL is compiled during the BIOS build process into AML.

ASL is the preferred source language for writing ACPI control methods. Most OEMs and BIOS developers write control methods in ASL. The ASL code is then translated by a translation tool to AML code versions of the control methods. It should be noted that ASL and AML are different languages although they are closely related.

Every ACPI compliant OS must support AML. However, use of ASL is not mandatory even though it is highly desirable to use ASL. At least in theory, a user can develop their own arbitrary source language, and use a translator to translate this arbitrary source language into AML.

AML is the ACPI control method virtual machine language, i.e., a machine code for a virtual machine which is supported by an ACPI-compatible OS. It is a pseudo-code assembly language that is interpreted by an OS driver. ACPI control methods can be written in AML, but programmers ordinarily code the control methods in ASL. Chapter 15 of the ACPI Specification, Revision 1.0a, published Jul. 1, 1998, by Intel, Microsoft, and Toshiba, describes the ASL reference, the disclosure of which is incorporated herein in its entirety. The ACPI Specification, Revision 1.0a, will hereafter be referred to as the "ACPI Specification."

AML is the language processed by the ACPI method interpreter. It is primarily a declarative language and provides a set of declarations that is compiled by the ACPI interpreter into the ACPI name space at definition block load time. One of the requirements of AML is that its access to memory, I/O, and PCI configuration space are either static or else the capabilities provided for dynamic values are so limited as to be largely useless because they are:

(a) evaluated at the time when the AML is first loaded by the OS; and (b) are very difficult to modify at that point.

For example, there are at least two objects where the ability to modify the object's parameters are desirable: Processor and OperationRegion. In general, OperationRegion(name, type, offset, length) provides the ASL code access to a chunk of memory, I/O space, PCI configuration space, embedded controller space, or SMBus space. However, although "offset" and "length" are expressions, they are only evaluated at the time when the OS loads the ACPI tables and is, therefore, difficult to modify based on changed conditions in the system, such as, when the I/O addresses are relocated by the Motherboard Configurable Devices/Plug and Play routines("MCD/PnP") or the jumper settings on the motherboard.

The ACPI Processor(name, APICID, offset, length) object declares a CPU and its power management control I/O ports to the OS. The "offset" and "length" are not expressions and, therefore, must be located at build time. This is extremely limiting, especially, if it is desired to relocate these I/O addresses using, for example, MCD/PnP.

It should be noted that Plug and Play (PnP) is the name of a technology developed by, inter alia, Microsoft and Intel, that lets PC hardware work automatically with attached peripheral devices. Motherboard Configurable Devices (MCD) is Phoenix Technologies' implementation of the PnP specification for use in a BIOS. Plug and Play technology is implemented in hardware, operating systems and in supporting software such as device drivers and BIOS. There are a variety of Plug and Play technologies, including, for example, BIOS, ISA, SCSI, IDE CD-ROM and some others. In this specification, reference to Plug and Play will be to the Plug and Play BIOS specification and to the MCD implementation of the Plug and Play BIOS specification.

Another problem arises because, in a system BIOS, users can enter the Setup program to modify the settings of motherboard integrated peripherals. The settings often include, for example, the device's default resource settings (I/O, IRQ, etc.), whether the device is enabled or disabled, and whether the OS is allowed to modify the device's settings at run-time.

In a legacy resource management system, such as PnP, these settings control the information that the run-time services return to the OS. Under ACPI, however, there are certain new problems that make this type of integration more difficult.

1. The OS no longer calls the PnP run-time services.

2. The ASL code (which replaces the PnP run-time calls) cannot access the CMOS memory to determine the user settings.

3. The OS assumes that if the _DIS (Disable) method exists for a device, calling it will disable the device. However, this can conflict with a user setting that specifies the device as being secured, and hence not changeable by the OS in this manner.

4. The OS assumes that if the _PRS (Possible Resource Settings) object is found under a device, then the device must support multiple configurations even if the user's setting indicates otherwise. Therefore, the OS can modify the resource settings in a manner inconsistent with a user's indicated preference using the Setup program.

The following subsection provides an overview of the ACPI architecture that facilitates a better understanding of the present invention which is summarized in the following section titled "Summary of the Invention."

Overview of the ACPI Architecture

The ACPI specification defines the ACPI interfaces including the interface between the OS software, the hardware and the BIOS software. in addition, the specification also defines the semantics of these interfaces.

Figure 1:
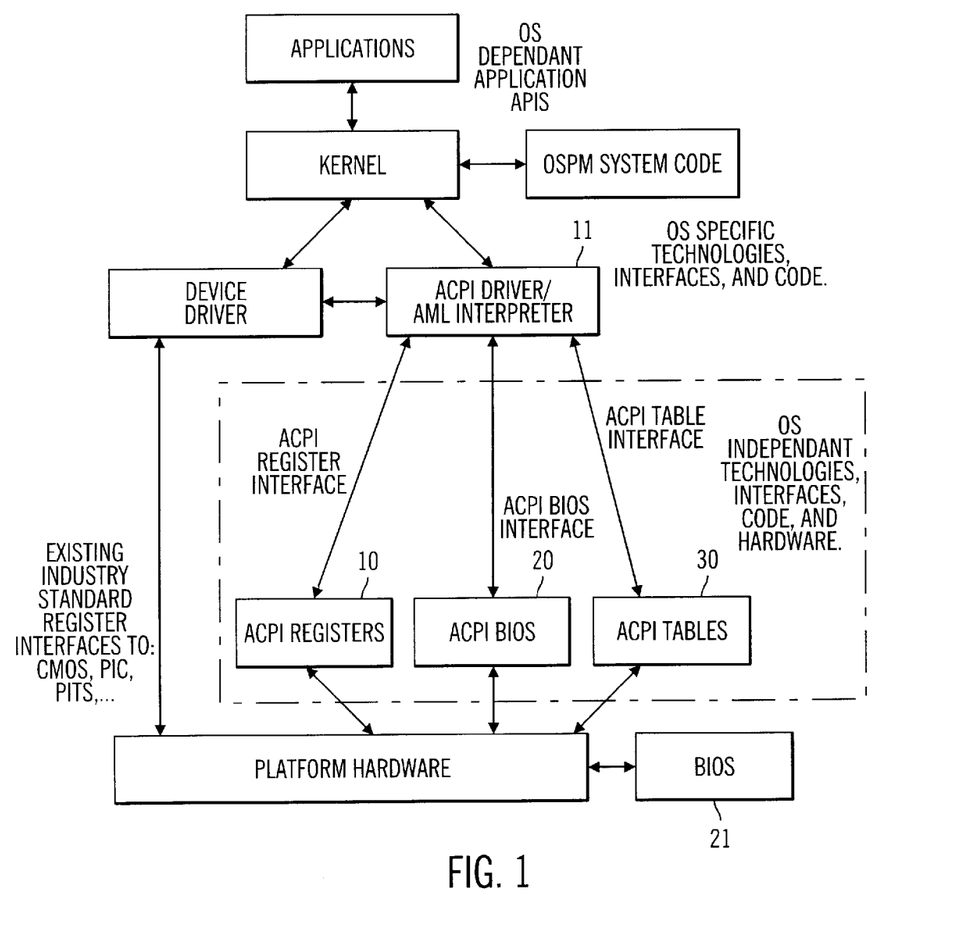
FIG. 1 is block diagram that shows the software and hardware components relevant to ACPI.

FIG. 1 is block diagram that defines the software and hardware components relevant to ACPI and how they relate to each other. The ACPI specification describes the interfaces between the components, the contents of the ACPI tables, and the related semantics of the other ACPI components. It is important to note that the ACPI tables are the key feature of an ACPI implementation and the role of an ACPI compliant BIOS is primarily to supply the ACPI tables rather than an Application Programming Interface (API).

FIG. 1 shows the three run-time components of ACPI:

(i) ACPI Tables 30—These tables describe the interfaces to the hardware. These interfaces can take a variety of configurations and include the descriptions in AML code. Some of the descriptions limit what can be built although most descriptions allow the hardware to be built in arbitrary ways, and can also describe arbitrary operation sequences needed to make the hardware function. Since, the ACPI tables can make use of AML which is interpreted, the OS contains an AML interpreter 11 that executes procedures encoded in AML and stored in the ACPI tables 30.

(ii) ACPI Registers 10—These are a limited part of the hardware interface, and are described, at least in location, by the ACPI tables 30.

(iii) ACPI BIOS 20—refers to the part of the firmware that is compatible with the ACPI specifications. Note that the ACPI BIOS 20 is normally not separate from a system BIOS 21 but is shown as a separate component to emphasize its additional functionality and compatibility with the ACPI specifications. Therefore, this ACPI BIOS 20 includes code that boots the machine, as well as implementing interfaces for sleep, wake, and some restart operations.

Further details of the ACPI are provided in ACPI Specification Document, Revision 1.0a dated Jul. 1, 1998, produced by Microsoft, Intel, and Toshiba, the contents of which are incorporated herein, in its entirety. This document is currently also available on the internet at http://www.teleport.com/acpi.

As discussed earlier, with the advent of the new ACPI specification, the services and resource configuration information that were earlier provided by Phoenix Technologies MCD/PnP subsystem must now be provided by the ACPI components. Therefore, the services and resource configuration that were earlier provided by MCD/PnP must now be defined in to an ACPI compliant BIOS in AML. In other words, the services and resource configuration information that were earlier provided by a legacy PnP BIOS must now be provided by the ACPI compliant BIOS.

Preferably, these PnP services and resource configuration information should be defined using the ASL language. The ASL language can then be compiled into AML so that an ACPI Driver together with an AML interpreter can access the AML code to provide the resource configuration information and other legacy PnP services to an ACPI compliant OS. Accordingly, there is a great need for porting all the PnP configuration specific code, which is in typically in an assembly language, to ASL, so that the ACPI compliant BIOS can provide the run-time services and resource configuration information that were earlier provided by the legacy MCD/PnP subsystem of a Phoenix Technology provided BIOS.

Porting all of this assembly code to ASL code is a herculean task because the assembly code is specific to each device. For example, Phoenix Technologies' BIOS stores the PnP resource configuration information in the form of device node structures. This Phoenix BIOS subsystem that stores the structures of devices is called the Motherboard Configurable Devices ("MCD") subsystem. The MCD structures are initialized by macros in the BIOS.

The ASL code needs to be generated for all possible configurations of the MCD devices and this can result in a large amount of ASL code being written. Therefore, there is a great need for the automatic conversion of these PnP MCD structures into ASL after the build process for the BIOS has been completed. Once this PnP MCD information has been converted to ASL, the ACPI compliant BIOS has access to the ASL code and is, therefore, aware of peripheral configuration information that was earlier provided by the legacy MCD/PnP subsystem.

SUMMARY OF THE INVENTION

Therefore, it is a general object of the invention to alleviate the problems and shortcomings identified above.

One of the objects of the invention is to provide a method for automated generation of ACPI ASL code in the BIOS of a computer system that provides the peripheral resource configuration information that is available in a legacy MCD/PnP BIOS.

Another object of the present invention is to provide an article of manufacture usable in a computer system that scans the device node structures in the BIOS to find device node structures that meet a specified criteria, and then generating the ASL code corresponding to the resource configuration information contained in the device node structures.

Another one of the objects of the invention is provide a method for the automated generation of ACPI ASL code that corresponds to device node structures for static devices.

Another one of the objects of the invention is to provide a method for the automated generation of ACPI ASL code that corresponds to device node structures for MCD devices.

A further object of the invention is to provide a method that generates the ACPI ASL code to include an identification Id that corresponds to a PnP Id of a device.

A further object of the invention is to provide a method that generates the ACPI ASL code including the _CRS control method and, optionally other control methods that are required.

Another one of the objects of the invention is to provide an article of manufacture usable in a computer system that generates the ASL code corresponding to static devices.

Another one of the objects of the invention is to provide an article of manufacture usable in a computer system that generates the ASL code corresponding to MCD devices.

A further object of the invention is to provide an article of manufacture usable in a computer system that generates the ASL code to include an identification Id that corresponds to a PnP Id of a device.

A further object of the invention is to provide an article of manufacture usable in a computer system that generates the ASL code to include a _CRS control method and, optionally other control methods that may be required.

These and other objects are achieved by providing a method for the automated generation of Advanced Configuration and Power Management Interface ("ACPI") Source Language ("ASL") code in a Basic Input-Output System ("BIOS") of a computer system having an ACPI compliant BIOS, comprising the steps of: (i) scanning device node structures in the BIOS; (ii) finding a device node structure according to a specified criteria; and (iii) generating ASL code corresponding to the device node structure found based on the specified criteria.

The method also provides that the specified criteria for finding device node structures includes device node structures that correspond to either static devices or to MCD devices.

The method also provides that generating the ASL code includes extracting the Pnp Id of a device.

The method further provides that generating the ASL code includes creating the _CRS control method and, optionally creating other control methods that may be required.

Also provided is an article of manufacture usable in a computer system having an Advanced Configuration and Power Management Interface ("ACPI") compliant Basic Input-Output System ("BIOS"), the article comprising a computer readable medium having a computer readable program code embodied therein for the automatic generation of ACPI Source Language ("ASL") code in the computer system, the computer readable program code including: (I) a first computer readable code for scanning all the device node structures in the BIOS and finding a device node structure according to a specified criteria, and (ii) a second computer readable code that modifies the ASL code corresponding to the found object based on the specified criteria.

The first computer readable code includes code that finds device node structures that correspond to either a static device or a MCD device.

The second computer readable code includes code that extracts a PnP Id from the device node structure.

The second computer readable code further includes code that creates a _CRS control method and optionally creates other control methods.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DESCRIPTION OF THE PREFERRED EMBODIMENT(S)

The present invention provides, in a general aspect, a method and an article of manufacture for the automated generation of Advanced Configuration and Power Management Interface ("ACPI") Source Language ("ASL") code in a Basic Input-Output System ("BIOS") of a computer system having an ACPI compliant BIOS, comprising the steps of: (i) scanning device node structures in the BIOS; (ii) finding a device node structure according to a specified criteria; and (iii) generating ASL code corresponding to the device node structure found based on the specified criteria.

The method and the article of manufacture also provide that the specified criteria for finding device node structures includes device node structures that correspond to either static devices or to MCD devices.

The method and the article of manufacture also provide that generating the ASL code includes extracting the Plug and Play (PnP) Id of a device.

The method and article of manufacture further provide that generating the ASL code includes creating the _CRS control method and, optionally creating other control methods that may be required.

An ACPI compliant OS expects several objects to be used in control methods to configure devices. These objects can be classified into three types:

(i) device identification objects that associate devices with PnP Ids;

(ii) device configuration objects that configure hardware resources for devices enumerated using ACPI; and (iii) device insertion and removal objects provide mechanisms for handling dynamic insertion and removal of devices. Each of these three types of devices are discussed in greater detail in the following paragraphs.

Device identification objects associate each platform device with a Pnp Id. The device identification objects are listed immediately below.

_ADR is an object that evaluates to a device's address on its parent bus.

_CID is an object that evaluates to a device's PnP compatible Id list.

_DDN is an object that associates a logical software name, for example COM 1, with a device.

_HID is an object which evaluates to a device's PnP hardware Id.

_SUN is an object that evaluates to a slot UI number for a slot.

_UID is an object that specifies a devices unique persistent Id, or a control method that generates it.

For any device that is not on an enumerable type of bus, for example, an ISA bus, the ACPI driver enumerates the devices' PnP Ids and the ACPI BIOS supplies a _HID for each device to enable the ACPI driver to enumerate the device. For devices on an enumerable bus, for example, a PCI bus, the ACPI system needs to identify which device on the enumerable bus is identified by the particular PnP Id. To accomplish this, the ACPI BIOS supplies an _ADR object.

Device configuration objects provide the information to configure the hardware resources for devices enumerated by ACPI. These objects provide information about current and possible resource requirements, the relationship between shared resources, and the methods for configuring hardware resources. The device configuration objects are as follows.

_CRS is an object that specifies a device's current resource settings, or a control method that generates such an object. This is a required object under the ACPI specification. The resource data is provided as a series of data structures, with each of the data structures having an unique tag or identifier. Examples of the data in the resource data structures include the data pertaining to standard computer system resources, such as, memory address ranges, I/O ports, interrupts, and DMA channels.

_DIS is a control method that disables a device.

_PRS is an object that specifies a device's possible resource settings, or a control method that generates such an object.

_PRT is an object that specifies the PCI interrupt routing table.

_SRS is a control method that sets a device's settings.

_FDI is an object that returns information regarding a floppy drive.

Device insertion and removal objects provide mechanisms for handling dynamic insertion and removal of devices. The same mechanisms are also used for docking and undocking. The device insertion and removal objects are listed below.

_EJD is an object that evaluates to the name of a device object upon which a named device is dependent. Whenever the named device is ejected, the dependent device must receive an ejection notification.

_EJx is a control method that ejects a device.

_LCK is a control method that locks or unlocks a device.

_RMV is an object that indicates whether a given device is removable.

_STA is a control method that returns a device's status.

Further details of the ACPI configuration objects are provided in chapter 6 of the ACPI specification, the contents of which are incorporated herein, in its entirety, by reference.

Figure 2:
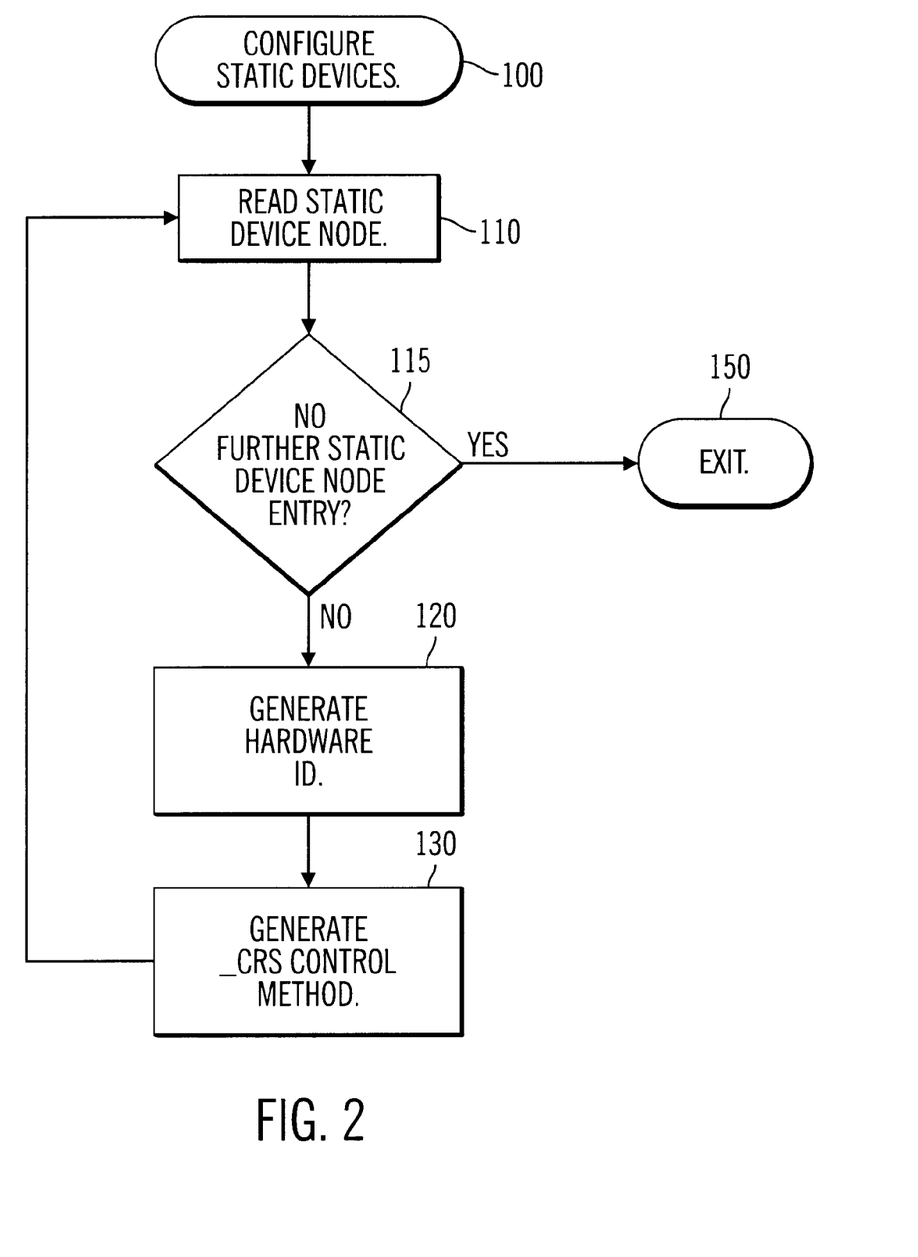
FIG. 2 is a flow diagram that illustrates the steps of one embodiment of the present invention that generates ASL code for static devices.

FIG. 2 is a flow diagram that illustrates the typical steps of a process 100 embodying one embodiment of the present invention that generates ASL configuration code for static devices. The present invention also provides the computer readable program code that implements the steps of the flow diagram of the configure static devices process 100. The actual coding of the disclosed steps is within the skills of one skilled in the computer and system programming arts without undue experimentation. Some sample code fragments are also provided to facilitate the understanding of the coding process of the steps disclosed in the flowchart.

In step 110, a static device node is read. The static device node is read from files that are generated by the BIOS build process. These files include, for example, the BCG.ROM, ROMEXEC.ROM, and the BUILD.MAP files. The static device nodes may be read, for example, by following the devNodePtrTable pointer in the BCG.ROM image file which is a pointer to the beginning of the static device node table. The static device node structures (_devnode) are read in from the static device node table. This structure contains the device information including the device node size, the device's PnP Id and the device node attributes.

In step 115, the process checks to see if all or a predetermined number of the static device nodes have been processed from the static device node table and, if there are no further static device node entries to be processed, the process is terminated 150. If another static device node is read in the process proceeds to step 120.

In step 120, the process generates the hardware ID of the device. The ASL code reports the hardware PnP Id of a device using the _HID object. The process extracts the PnP Id from the _devnode structure and generates the _HID object. The generated _HID object is typically written to an output file. The process then proceeds to step 130.

In step 130, the process generates the _CRS control method of the static device node. Furthermore, since the configuration of a static device node is not changeable, by definition, no further control methods are generated for a static device. The bytes that follow a device node structure (_devnode) are a pointer to the device configuration data. The _CRS control method returns the configuration in the form of a data structure specified by the ACPI specification.

Appendix A is a sample code fragment for a routine that generates the ASL code for a static device as well as the structure of a static device object.

Figure 3:
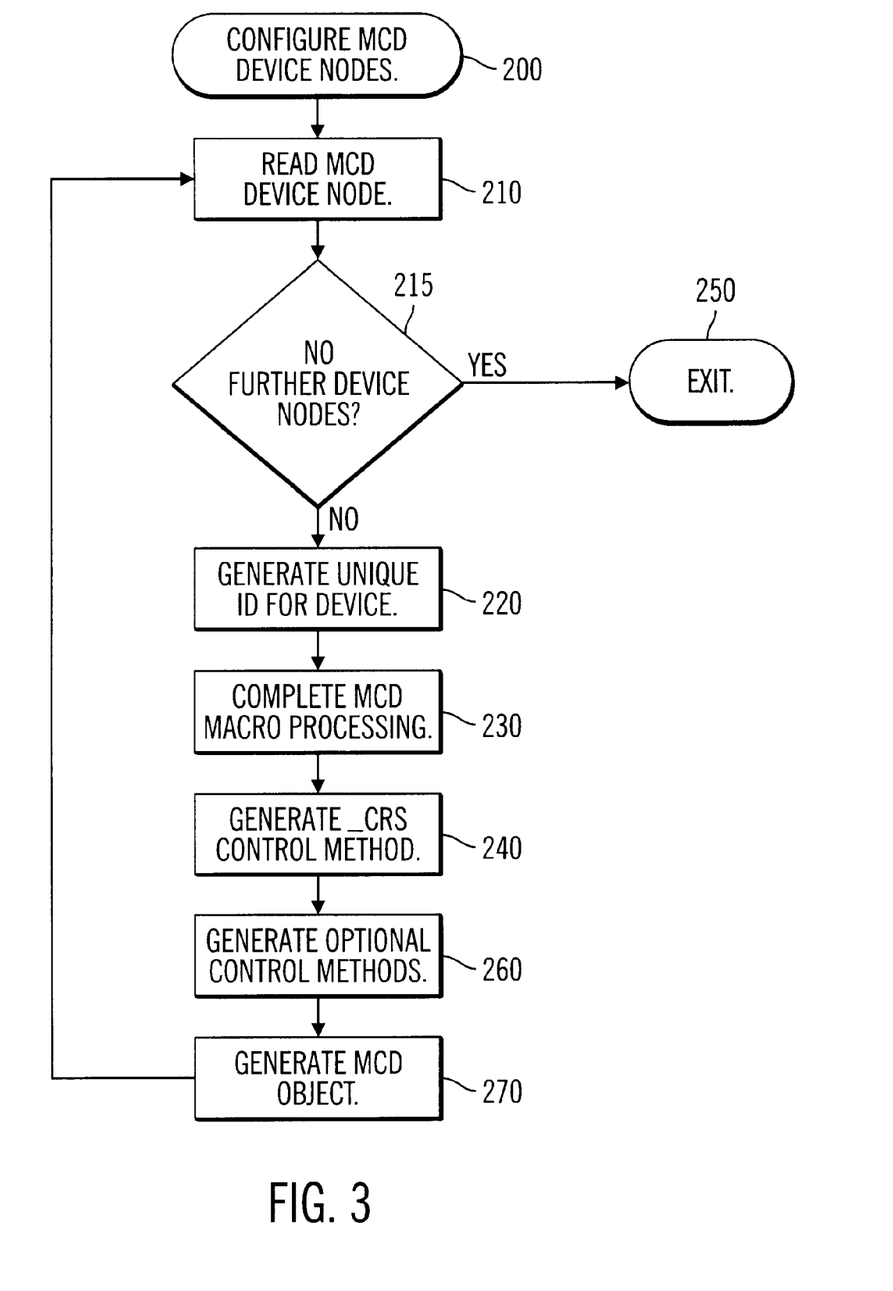
FIG. 3 is a flow diagram that illustrates the steps of another embodiment of the present invention that generates ASL code for MCD devices.
Figure 4:
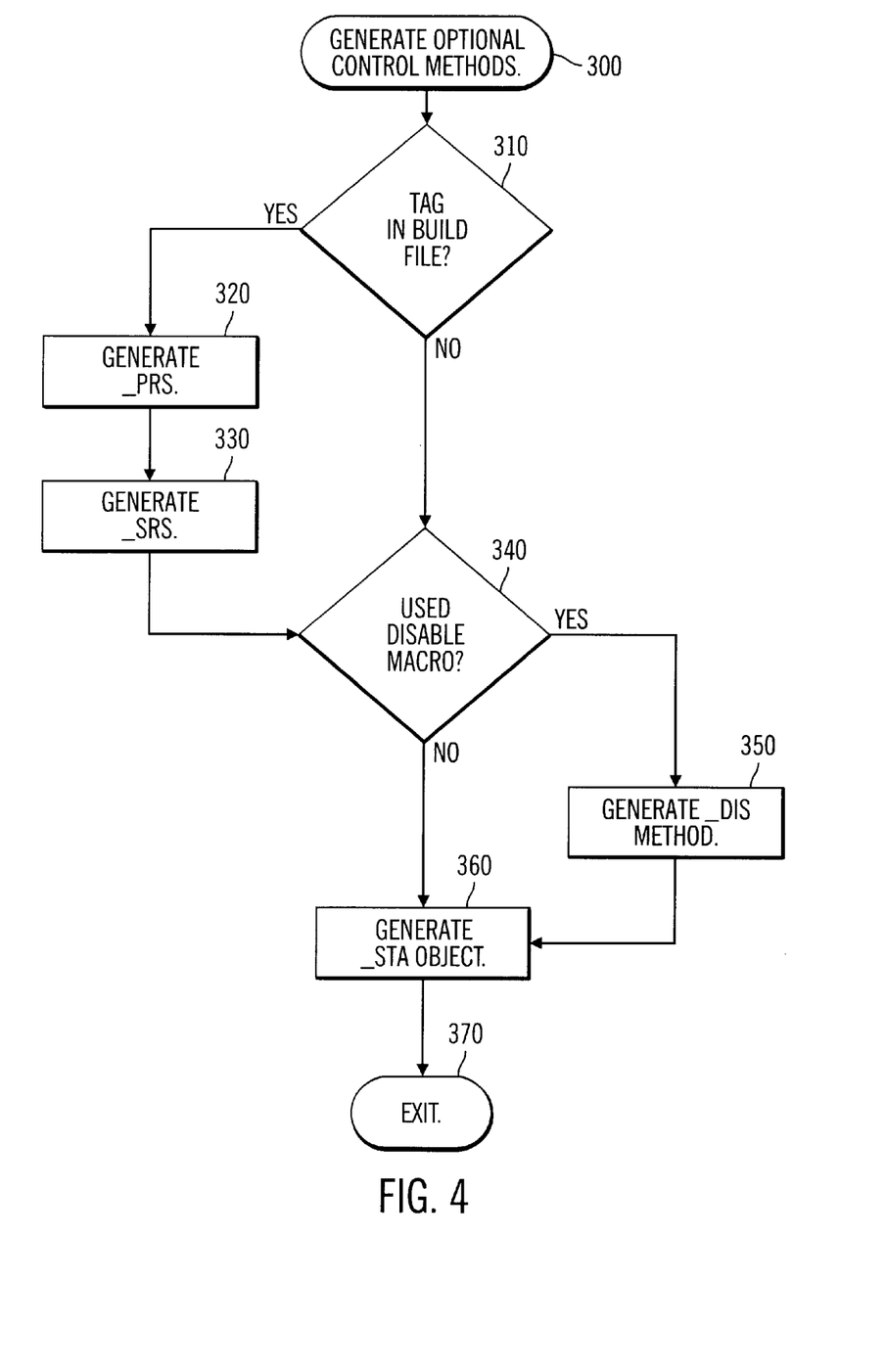
FIG. 4 is flow diagram that illustrates the steps of the generate optional control methods process.

FIGS. 3 and 4 are flow diagrams that illustrates the steps of a process embodying another embodiment of the present invention that generates ASL code for MCD devices. The present invention also provides the computer readable program code that implements the steps of the flow diagram of the configure MCD devices process 200 and the generate optional control methods process 260. The actual coding of the disclosed steps in these processes is within the skills of one skilled in the computer and system programming arts without undue experimentation.

FIG. 3 is a flow diagram disclosing the steps of the configure MCD nodes process. In step 210, the process reads the next MCD device node structure. The process reads a build file, BCG.ROM, in which the MCD device node structures are stored in a dynamic device table with specific start and end addresses. The read process 210 begins by reading the first entry from the dynamic device table during the first iteration of the MCD devices process 200 and, thereafter, reads next entry from the dynamic device table in successive iterations of the read process 200 until the process is terminated at step 250.

In step 215, the process checks to see if there are any further MCD device node entries. If there are no further MCD device entries, the process 200 terminates in step 250. It is to be understood that it is also possible that the process 200 may be terminated after a predetermined number of MCD device node structures have been read. This can be implemented, for example, by changing the process so that step 215 checks to determine if the predetermined number of MCD device nodes have been read. If not, the process 200 proceeds to step 220 to generate unique Ids for the device.

In step 220, the process extracts the PnP Id of the device to generate the _HID object which is then typically written to an output file. In step 220, the process also generates an _UID object to distinguish between two devices that have the same _HID. For example, if a Super I/O controller has two serial ports that have the same _HID, separate _UID objects are generated to differentiate between these two devices.

In step 230, the process 200 generates a call with appropriate parameters to the read/write methods corresponding to MCD macros. The read/write methods are specific to the chipsets and need to be written by a chipset engineer. MCD provides three macros which allow a component engineer to change configuration information for a device. The process 200 interprets these MCD macros and generates ASL packages. These packages can then be processed by other control methods, such as the _CRS, _SRS, _DIS control methods to appropriately change the current state of the device.

In step 240, the process 200 generates the _CRS control method which is a required control method in accordance with the ACPI specification. A function, process_get_current is provided which gets the current resources of a device. This function calls, for example, two other functions that get the MCD macro information and then put that information in an ASL package. Step 240 also generates the ASL code that understands the information stored in these ASL packages. Step 240 also invokes a function, create_template, which creates empty ASL buffers used by _CRS. The _CRS methods then fills these buffers with the current resource configuration and returns the buffer to the OS.

Phoenix MCD uses two types of resources, dependent and independent resources. Both the dependent and independent resources together constitute a complete resource. The _CRS control method reads the data from the chip and depending upon the values in the chip it returns the combination of both the independent and dependent resources to the OS.

In step 260, the process 200 generates the other optional control methods. FIG. 4 shows the steps of a flowchart that discloses the detailed steps of the generate optional control methods process 260.

In step 310, the process 260 searches for a tag, such as, TAG_DEVICE_NODE_POSSIBLE_START tag name in the build or BIOS ROM file, such as, for example, BCG.ROM. If the process 260 does not find the tag in step 310 it proceeds to decision block 340. If the process 260 finds the tag in step 310, it proceeds to step 320, where it generates and writes out the _PRS object which describes the possible resource settings for a device. In step 330, the process 260 generates the _SRS control method once the _PRS control method is generated. The OS calls the _SRS control method when it wants to set the configuration of the device. The _SRS control method is not generated when there is no _PRS control method.

In step 340, the process 260 checks the build or BIOS ROM file to determine whether the MCD device has used the DISABLE_CONFIG_START macro. If yes, the process 260 proceeds to step 350 to generate the _DIS control method which is used by the OS to disable the device and then goes to step 360. If not, the process proceeds directly to step 360.

Step 360 generates the _STA object which is used to inform the OS if a device is disabled and not present. The _STA object is typically updated during the Power-on Self Test (POST) processing of the BIOS at computer boot time.

Process 200 proceeds to step 270 after completing the processing in step 260. In step 270, the configure MCD device nodes process 200 generates the MCD object for the device. The MCD object for the device typically contains the value 0x8000xxxx, where xxxx stands for the device node number for this device. The device node number is then used by POST processing to correctly update the device's status during POST.

Other embodiments of the invention will be apparent to those skilled in the art from a consideration of the specification and practice of the invention disclosed herein. It is intended that the specification be considered as exemplary only, with the true spirit and scope of the invention being indicated by the following claims.

What is claimed is:

1. A method for the automated generation of Advanced Configuration and Power Management Interface ("ACPI") Source Language ("AML") code for incorporation into a Basic Input-Output System ("BIOS") of a computer system having an ACPI compliant BIOS, comprising the steps of:
   scanning device node structures in the BIOS defined by non-ACPI-compliant BIOS code;
   finding a device node structure based on a specified criteria; and
   generating ASL code corresponding to the device node structure found based on the specified criteria.

2. The method according to claim 1, wherein the device node structure corresponds to a static device.

3. The method according to claim 1, wherein the step of generating ASL code includes getting a Plug-n-Play (PnP) Id of a device from the device node structure and writing the PnP Id to an output file.

4. The method of claim 3, wherein the step of generating the ASL further includes creating a _CRS control method for the device.

5. The method of claim 2, wherein the step of finding a device node structure based upon a specified criteria includes following a device node table pointer to the static device node table and reading the static device node structures which are contained in one or more files that are generated during a BIOS build process.

6. The method of claim 1, wherein the specified criteria includes determining if the device node structure corresponds a Motherboard Configurable Device ("MCD").

7. The method according to claim 6, wherein the step of generating the ASL code includes getting a Plug-n-Play ("PnP") Id of a device from the device node structure.

8. The method of claim 7, wherein the step of generating the ASL code further includes generating a secondary Id to differentiate between two devices that have the same PnP Id.

9. The method of claim 6, wherein the step of generating the ASL code includes
   reading MCD macros; and
   generating ASL package code that encodes the information contained in the MCD macros.

10. The method of claim 9, wherein the step of generating the ASL code includes generating the _CRS control method, and optionally generating the _PRS, _SRS, _DIS, _STA control method.

11. An article of manufacture usable in a computer system having an Advanced Configuration and Power Management Interface ("ACPI") compliant Basic Input-Output System ("BIOS"), the article comprising:
   a computer readable medium having a computer readable program code embodied therein for automatic generation of ACPI Source Language ("ASL") code in the computer system, the computer readable program code including
      a first computer readable code for scanning the device node structures in non-ACPI-compliant BIOS code portions and finding a device node structure according to a specified criteria, and
      a second computer readable code that modifies the ASL code corresponding to the found object based on the specified criteria.

12. The article according to claim 11, wherein the device node structure corresponds to a static device.

13. The article according to claim 11, wherein the first computer readable code includes code that extracts a Plug-n-Play ("PnP") Id from the device node structure and writes the PnP Id to an output file.

14. The article according to claim 13, wherein the second computer readable code includes code that creates a _CRS control method for the device.

15. The article according to claim 12, wherein the first computer readable code includes code that reads the BCG.ROM, ROMEXEC.ROM, and BUILD. MAP files that are generated during the BIOS build process.

16. The article according to claim 11, wherein first computer readable code includes code that determines if the device node structure corresponds to a Motherboard Configurable Device ("MCD").

17. The article according to claim 16, wherein the second computer readable code includes code that extracts a PnP Id of a device from a device node structure.

18. The article according to claim 17, wherein the second computer readable code includes code that generates a secondary Id to differentiate between devices that have the same PnP Id.

19. The article according to claim 16, wherein the second computer readable code includes code that reads MCD macros and generates ASL package code that encodes the information contained in the MDC macros.

20. The article according to claim 19, wherein the second computer readable code further includes code that generate the _CRS control method, and optionally generates the _PRS, _SRS, _DIS, _STA control methods.

* * * * *